Patented Apr. 27, 1954

2,676,959

UNITED STATES PATENT OFFICE 2,676,959

MONOAZO DYESTUFFS

Rudolf Ruegg, Basel, and Heinrich Zollinger, Binningen, Switzerland, assignors to Ciba Limited, Basel, Switzerland, a Swiss firm No Drawing. Application November 2, 1951, Serial No. 254,647

Claims priority, application Switzerland November 9, 1950

5 Claims. (Cl. 260—199)

This invention provides the valuable new monoazo-dyestuffs which correspond to the general formula (1)

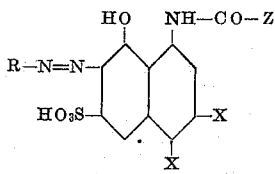

in which R represents an aromatic radical of the benzene series free from groups imparting solubility in water and free from hydroxyl groups bound in ortho-position relatively to the azo group, Z represents a benzene radical containing as a substituent at least one saturated hydrocarbon radical having at least 3 and at most 8 carbon atoms, and one X represents hydrogen and the other X a sulfonic acid group. As saturated hydrocarbon radicals there are included, together with alkyl radicals, also radicals of the alicyclic series, especially the cyclohexyl radical.

For the production of such dyestuffs, for example, any desired diazo-compound of an aromatic amine of the benzene series free from groups imparting solubility in water and containing no hydroxyl group in ortho-position to the amino group is coupled with a coupling component of the formula (2)

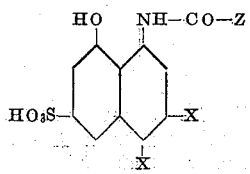

in which the symbols X and Z have the meanings given in connection with the above Formula 1. This applies also to the formula given below.

The coupling components of the Formula 2 used as starting materials in the present process are new. They can be made by methods in themselves known, for example, by monoacylating a 1-amino-8-hydroxy-naphthalene-3:6- or 4:6-disulfonic acid with a halide of an acid of the formula (3) 

This monoacylation may be carried out, for example, in a weakly alkaline aqueous medium with the use of para-n-propyl-, para-isopropyl-, para-tertiary-amyl-, or metatertiary-butyl-benzoic acid chloride, 2-methyl-4-tertiary-butyl-benzoic acid chloride, 2:6-dimethyl-4-tertiary butyl-benzoic acid chloride, 4-n-octyl-benzoic acid chloride, 4-cyclohexyl-benzoic acid chloride or bromide, or advantageously with 4-tertiary-butyl-benzoic acid chloride.

As diazo-components there may be used any desired aromatic amines of the benzene series which are free from hydroxyl groups in ortho-position to the amino group and from groups imparting solubility in water, that is to say, sulfonic acid groups and carboxyl groups. There come into consideration, for example, aniline, toluidines, for example, 2-methyl-1-aminobenzene, xylidines, for example, 2:4-dimethyl-1-aminobenzene, alkoxyanilines, for example, 2:5-dimethoxy-4-chloro-1-aminobenzene, 2-methoxy-1-aminobenzene, 2-methoxy-5-tertiary-amyl-1-aminobenzene, also 2-ethyl-1-aminobenzene, 4-n-amyl-1-aminobenzene, 2-methyl-5-isopropyl-1-aminobenzene, 2:4:5-trimethyl-1-aminobenzene, chloranilines, for example, 3-chloro-1-aminobenzene, 2-methyl-5-chloro-1-aminobenzene, and also 4-acetylamino-1-aminobenzene. Especially valuable results are obtained with diazo-compounds from aminobenzenes, which contain in ortho-position to the amino group an alkyl or an alkoxy group, preferably those which contain not more than 4 carbon atoms, advantageously a methyl, an ethyl or a methoxy group.

These amines can be diazotized by the usual methods, for example, by means of sodium nitrite and a mineral acid, and the resulting diazo-compound coupled with a coupling component of the Formula 2 in an alkaline aqueous medium, for example, a medium rendered alkaline with sodium carbonate.

The resulting monoazo-dyestuffs of the Formula 1 are new and can be used for dyeing or printing a very wide variety of materials, especially those of animal origin such as leather, silk and above all wool, and also various artificial fibers, for example, those composed of animalized artificial silk, superpolyamides or superpolyurethanes. The dyeings obtained with these dyestuffs are distinguished by their valuable tints and their very good properties of fastness. Especially valuable are the dyestuffs of the Formula 1, in which Z represents a benzene radical containing, preferably in p-position to the —CO-group, at least one alkyl group of 3–6 carbon atoms.

The following examples illustrate the invention, the parts and percentages being by weight.

Example 1

9.3 parts of aniline are diazotized in 30 parts of hydrochloric acid of 30% strength and 200 parts of water at 0° C. with a solution of 7 parts of sodium nitrite in 25 parts of water.

The resulting diazo-solution is added at 0°–5° C. in the form of a thin stream to a well stirred solution of 47.9 parts of 1-(4'-tertiary-butyl-benzoylamino)-8-hydroxynaphthalene-3:6-disulfonic acid and 50 parts of sodium carbonate in 500 parts of water. When the coupling reaction is complete the dyestuff formed is separated by filtration and dried. It is a red-brown powder, which dissolves in water with a red coloration and dyes wool from an acetic acid bath bright red tints having excellent properties of wet fastness.

The 1-(4'-tertiary-butyl-benzoylamino)-8-hydroxynaphthalene-3:6-disulfonic acid may be prepared as follows:

319 parts of 1-amino-8-hydroxynaphthalene-3:6-disulfonic acid are suspended in 1500 parts of water and dissolved by the addition of 80 parts of sodium hydroxide. There are so added simultaneously to the solution at 30°–40° C. in the course of 5 hours 260 parts of paratertiary-butyl-benzoyl chloride and 200 parts of sodium carbonate while stirring well that the mixture always has a weakly alkaline reaction to phenolphthalein. The temperature is maintained at 30°–40° C. for 2 hours, and then at 90°–95° C. for a further 2 hours. The whole is then allowed to cool to 20° C., and after 20 hours the precipitated product is separated by filtration. If necessary, for the purpose of purification the product is dissolved in hot water and decolorized by the addition of active carbon. After filtering off the carbon the product is reprecipitated by the addition of a saturated solution of sodium chloride. There is obtained after filtering and drying the disodium salt of 1-(4'-tertiary-butyl-benzoylamino)-8-hydroxynaphthalene-3:6-disulfonic acid in the form of a pale grey powder which dissolves in water to give an almost colorless solution.

By using 1-amino-8-hydroxynaphthalene-4:6-disulfonic acid instead of 1-amino-8-hydroxynaphthalene-3:6-disulfonic acid there is obtained in an analogous manner 1-(4'-tertiary-butyl-benzoylamino)-8-hydroxynaphthalene-4:6-disulfonic acid.

Example 2

15.0 parts of 4-acetylamino-1-aminobenzene are diazotized in 30 parts of hydrochloric acid of 30% strength and 200 parts of water at 0° C. with a solution of 7 parts of sodium nitrite in 25 parts of water.

The diazo-solution so obtained is added at 0°–5° C. in the form of a thin stream to a well stirred solution of 47.9 parts of 1-(4'-tertiary-butyl-benzoylamino)-8-hydroxynaphthalene-3:6-disulfonic acid and 50 parts of sodium carbonate in 500 parts of water. When the coupling reaction is complete, the dyestuff formed is separated by filtration and dried. It is a dark powder, which dissolves in water with a bluish-red coloration and dyes wool from an acetic acid bath a brilliant ruby red tint having excellent wet fastness properties.

By using in this example 10.7 parts of 2-methyl-1-aminobenzene, instead of 15.0 parts of 4-acetylamino-1-aminobenzene, there is obtained a dyestuff which dissolves in water with a bluish-red coloration and dyes wool from an acetic acid bath brilliant red tints having excellent wet fastness properties.

Example 3

A diazo-solution prepared in the usual manner from 6.2 parts of 2-ethyl-1-aminobenzene is introduced dropwise at 0°–5° C. into a solution of 27 parts of the disodium salt of 1-(4'-tertiary-butyl-benzoylamino)-8-hydroxynaphthalene-3:6-disulfonic acid in 400 parts of water to which there were previously admixed 200 parts of a sodium carbonate solution of 10% strength. There is obtained a blue-red dyestuff which is separated by filtration after a few hours, and, if desired, is purified by dissolution in hot water and partial salting out. The dried dyestuff is a blue-red powder which dissolves in water with a blue-red coloration and in concentrated sulfuric acid with a violet coloration. The dyestuff dyes wool from an acetic acid bath pure blue-red tints having good properties of fastness to washing and light. In its free acid state it corresponds to the formula

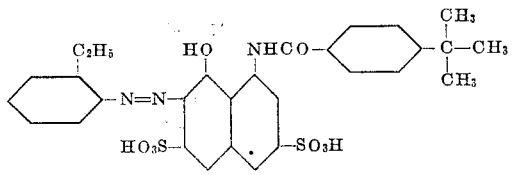

By using 1-(4'-tertiary-butyl-benzoylamino)-8-hydroxynaphthalene-4:6-disulfonic acid, instead of 1-(4'-tertiary-butyl-benzoylamino)-8-hydroxynaphthalene-3:6-disulfonic acid, there is obtained a more yellowish dyestuff having similar properties.

Example 4

A diazo-solution prepared in the usual manner from 6.2 parts of 2-ethyl-1-aminobenzene is introduced dropwise at 0°–5° C. into a solution of 28 parts of the disodium salt of 1-(4'-cyclohexyl-benzoylamino)-8-hydroxynaphthalene-3:6-disulfonic acid in 400 parts of water, which is mixed with 200 parts of a sodium carbonate solution of 10% strength. There is obtained a blue-red dyestuff which in its free acid state corresponds to the formula

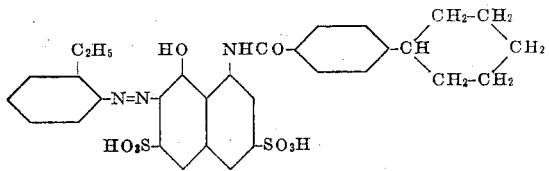

is filtered off after a few hours and is washed with cold water, and then dried. There is obtained a blue-red powder which dissolves in water and in concentrated sulfuric acid with a blue-red coloration and dyes wool from an acetic acid bath pure blue-red tints which are very fast to washing and fulling.

Example 5

To a solution of 27 parts of the disodium salt of 1-(4'-tertiary-butyl-benzoylamino)-8-hydroxynaphthalene-3:6-disulfonic acid in 400 parts of water, mixed with 200 parts of a sodium carbonate solution of 10 per cent strength, there is added dropwise at 0°–5° C. the diazo solution prepared in the usual manner from 9.4 parts of 4-chloro-2:5-dimethoxyaniline. A violet dyestuff forms immediately and is separated by filtration after a few hours and then dissolved in hot water for purification. The hot solution is clarified and the greater part of the dyestuff precipitated by the addition of saturated sodium chloride solution to the hot solution. The dyestuff is then filtered and dried. It is a blue-red powder which dissolves in water with a violet coloration and in concentrated sulfuric acid with a blue coloration and dyes wool from an acetic acid bath pure violet tints fast to washing and light.

By using 9.7 parts of 2-amino-1-methoxy-4-tertiary amyl benzene in lieu of 9.4 parts of 4-chloro-2:5-dimethoxyaniline, a dyestuff is obtained which after drying is a blue-red powder and dissolves in hot water with a blue-red coloration and in concentrated sulfuric acid with a blue coloration. In its free acid state it corresponds to the formula

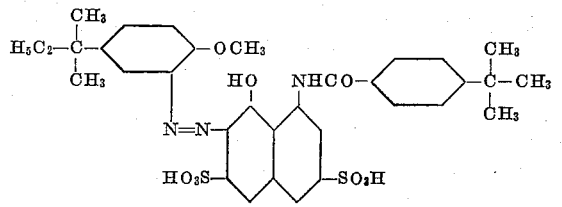

and dyes wool from an acetic acid bath blue-red tints of good light fastness and particularly good fastness to washing and fulling.

*Example 6*

2 parts of the dyestuff obtainable as described in the first and second paragraphs of Example 1 are dissolved in 4,000 parts of water, 10 parts of crystalline sodium sulfate are added to the dye bath, and 100 parts of wool are entered at 40°–50° C. 3 parts of acetic acid of 40% strength are then added, the whole is raised to the boil in the course of half an hour, and dyeing is carried on at that temperature for ¾ of an hour. After rinsing and drying there is obtained a brilliant red dyeing having very good properties of wet fastness.

What we claim is:

1. A monohydroxymonoazo dyestuff which in the state of the free acid corresponds to the formula

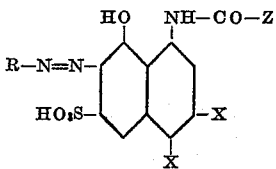

wherein R represents a benzene radical free from groups imparting solubility in water, one X represents a sulfonic acid group, the other X represents a hydrogen atom, and Z represents a benzene radical containing one saturated hydrocarbon group having at least 3 and at most 8 carbon atoms.

2. A monohydroxymonoazo dyestuff which in the state of the free acid corresponds to the formula

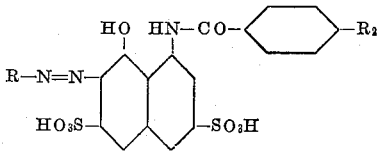

wherein R represents a benzene radical free from groups imparting solubility in water and substituted in o-position to the azo group by a member selected from the group consisting of an alkyl group of at most 4 carbon atoms and an alkoxy group containing at most 4 carbon atoms and $R_2$ represents a saturated hydrocarbon radical having at least 3 and at most 8 carbon atoms.

3. The monoazo dyestuff which in the state of the free acid corresponds to the formula

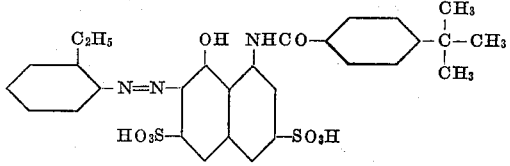

4. The monoazo dyestuff which in the state of the free acid corresponds to the formula

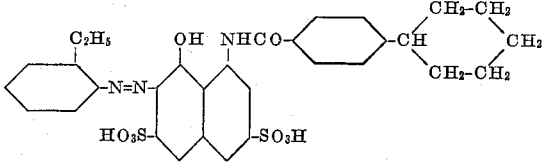

5. The monoazo dyestuff which in the state of the free acid corresponds to the formula

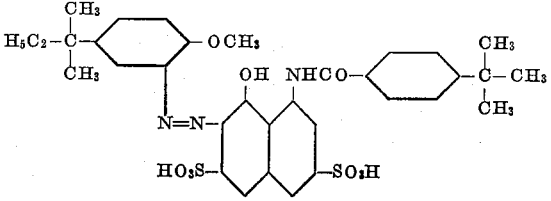

References Cited in the file of this patent
UNITED STATES PATENTS

| Number | Name | Date |
|---|---|---|
| 1,073,902 | Julius et al. | Sept. 23, 1913 |
| 1,073,904 | Julius et al. | Sept. 23, 1913 |
| 1,824,686 | Richard | Sept. 22, 1931 |